US011900093B2

(12) United States Patent
Pokorny et al.

(10) Patent No.: US 11,900,093 B2
(45) Date of Patent: Feb. 13, 2024

(54) CONSTRUCTING PIPELINES FOR IMPLEMENTING A SOFTWARE-STACK RESOLUTION PROCESS

(71) Applicant: RED HAT, INC., Raleigh, NC (US)

(72) Inventors: Fridolin Pokorny, Modry Kamen (SK); Christoph Goern, Bonn (DE)

(73) Assignee: Red Hat, Inc., Raleigh, NC (US)

( * ) Notice: Subject to any disclaimer, the term of this patent is extended or adjusted under 35 U.S.C. 154(b) by 96 days.

(21) Appl. No.: 17/380,820

(22) Filed: Jul. 20, 2021

(65) Prior Publication Data
US 2023/0027810 A1  Jan. 26, 2023

(51) Int. Cl.
| | |
|---|---|
| G06F 9/38 | (2018.01) |
| G06F 9/30 | (2018.01) |
| G06F 8/65 | (2018.01) |
| G06F 9/445 | (2018.01) |
| G06F 8/71 | (2018.01) |

(52) U.S. Cl.
CPC .............. G06F 8/65 (2013.01); G06F 8/71 (2013.01); G06F 9/44505 (2013.01)

(58) Field of Classification Search
CPC .......... G06F 8/65; G06F 8/71; G06F 9/44505; G06F 9/5038; G06F 9/5066
See application file for complete search history.

(56) References Cited

U.S. PATENT DOCUMENTS

| | | | |
|---|---|---|---|
| 7,765,592 B2 | 7/2010 | Wang et al. | |
| 7,971,187 B2 | 6/2011 | Sanghvi et al. | |
| 8,832,647 B2 | 9/2014 | Cope et al. | |
| 9,519,477 B2 | 12/2016 | Champlin-Scharff et al. | |
| 10,127,146 B2 | 11/2018 | Moretto et al. | |
| 10,853,124 B2 * | 12/2020 | Ago | G06F 16/21 |

(Continued)

FOREIGN PATENT DOCUMENTS

WO   2011143455 A1   11/2011

OTHER PUBLICATIONS

"Declarative Management of Kubernetes Objects Using Configuration Files," Kubernetes, 2021, https://kubernetes.io/docs/tasks/manage-kubernetes-objects/declarative-config/.

(Continued)

*Primary Examiner* — Lewis A Bullock, Jr.
*Assistant Examiner* — Mohammad H Kabir
(74) *Attorney, Agent, or Firm* — Kilpatrick Townsend & Stockton LLP

(57) ABSTRACT

A pipeline can be constructed for implementing a software-stack resolution process. For example, a system can receive a request from a client device for a recommended software-stack for a target software item. The system can also receive pipeline configuration data specifying configurable pipeline units to be included in the pipeline. The pipeline can include a search process for identifying and analyzing a group of software-stack candidates associated with the target software item. The system can construct the pipeline using the configurable pipeline units based on the pipeline configuration data. One or more of the configurable pipeline units can be arranged in the pipeline to guide the search process by adjusting one or more parameters of the search process. The system can then execute the pipeline and transmit a response to the client device indicating a recommended software-stack for the target software item.

20 Claims, 12 Drawing Sheets

(56) References Cited

U.S. PATENT DOCUMENTS

| | | | |
|---|---|---|---|
| 10,901,705 B2 | 1/2021 | Duggal et al. | |
| 2009/0282403 A1* | 11/2009 | Poole | H04L 67/34 |
| | | | 717/178 |
| 2011/0238797 A1* | 9/2011 | Wee | G06F 15/177 |
| | | | 709/220 |
| 2011/0258619 A1 | 10/2011 | Wookey | |
| 2012/0284380 A1* | 11/2012 | Anderson, III | H04L 9/40 |
| | | | 709/223 |
| 2021/0303296 A1* | 9/2021 | Ahuja | G06F 8/65 |

OTHER PUBLICATIONS

U.S. Appl. No. 16/933,504, filed Jul. 20, 2020.
"Introduction to the Machine Learning Stack," Mar. 16, 2019, https://hackernoon.com/introduction-to-the-machine-learning-stack-f5b64bba7602.
"MS Resolver™," Pattern Recognition Systems, Downloaded from Internet on Apr. 3, 2020, http://www.prs.no/MS Resolver/MS Resolver.html.

* cited by examiner

```
name: BootUnit
type: boot
should_include:
  match:
    package_name: flask
run:
  stack_info:
    - type: ERROR
      message: "Unable to perform this operation"
      link: https://thoth-station.ninja

# Configuration of prematurely terminating the resolution process - the
# message will be reported to the user. If this configuration option is not
# set, the resolver will not terminate when running this unit.
eager_stop_pipeline: "Terminating resolution as 'flask' is in direct dependencies."

# Configuration of prematurely terminating the resolution process.
not_acceptable: "Cannot include this package"

log:
  message: "Some text printed to log on pipeline unit run."
  type: "WARNING"
```

FIG. 5

```
name: SieveUnit
type: sieve
should_include:
match:
  package_version:
    name: flask
    version: '>1.0,<=1.1.0'
    index_url: 'https://pypi.org/simple'
run:
  log:
    type: "WARNING"
  stack_info:
  - type: WARNING
    message: "Hello, world"
    link: https://thoth-station.ninja
```

```
name: StepUnit
type: step
should_include:
match:
  package_version:
    name: flask
    version: '>1.0,<=1.1.0'
    index_url: 'https://pypi.org/simple'
state:
  resolved_dependencies:
    - name: werkzeug
      version: "==1.0.0"
      index_url: 'https://pypi.org/simple'
run:
  score: 0.42
  justification:
    - type: INFO
      message: "Hello, Thoth!"
      link: https://thoth-station.ninja not_acceptable: "Bad package inclusion"

Configuration of prematurely terminating the resolution process.
eager_stop_pipeline: "Stop pipeline"

multi_package_resolution: false

...
```

FIG. 8

```
name: StrideUnit
type: stride
should_include:
match:
state:
  resolved_dependencies:
    - name: werkzeug
      version: "~=1.0.0"
      index_url: 'https://pypi.org/simple'
run:
  log:
    type: "WARNING"
  stack_info:
    - type: WARNING
      message: "Hello, world"
      link: https://thoth-station.ninja not_acceptable: "Bad package inclusion"

Configuration of prematurely terminating the resolution process.
eager_stop_pipeline: "Stop pipeline"
```

FIG. 9

CONSTRUCTING PIPELINES FOR IMPLEMENTING A SOFTWARE-STACK RESOLUTION PROCESS

TECHNICAL FIELD

The present disclosure relates generally to software stacks. More specifically, but not by way of limitation, this disclosure relates to constructing a pipeline in accordance with pipeline configuration data for implementing a process to identify a recommended software-stack for a target software item.

BACKGROUND

A software stack is a set of software components (e.g., packages) configured to work in tandem to produce a result or achieve a common goal. The software components may include operating systems, architectural layers, protocols, run-time environments, databases, libraries, etc., that are stacked on top of each other in a hierarchy, such that at least some of the software components either directly or indirectly depend on others of the software components. For example, two well-known software stacks are LAMP (Linux, Apache, MySQL, and PHP/Perl/Python) and WINS (Windows Server, IIS, .NET, and SQL Server). Software stacks generally include all of the software components needed to run a target software item such as an application or service, so that no additional software is needed to support the target software item. A software stack is typically provided as a bundle for easy and fast installation, even though the software components in the bundle are often created and maintained by different developers independently of one another.

BRIEF DESCRIPTION OF THE DRAWINGS

FIG. 5 shows an example of a definition for a boot unit that can be included in the pipeline according to some aspects of the present disclosure.

FIG. 7 shows an example of a definition for a sieve unit that can be included in the pipeline according to some aspects of the present disclosure.

FIG. 8 shows an example of a definition for a step unit that can be included in the pipeline according to some aspects of the present disclosure.

FIG. 9 shows an example of a definition for a stride unit that can be included in the pipeline according to some aspects of the present disclosure.

DETAILED DESCRIPTION

Figure 1:
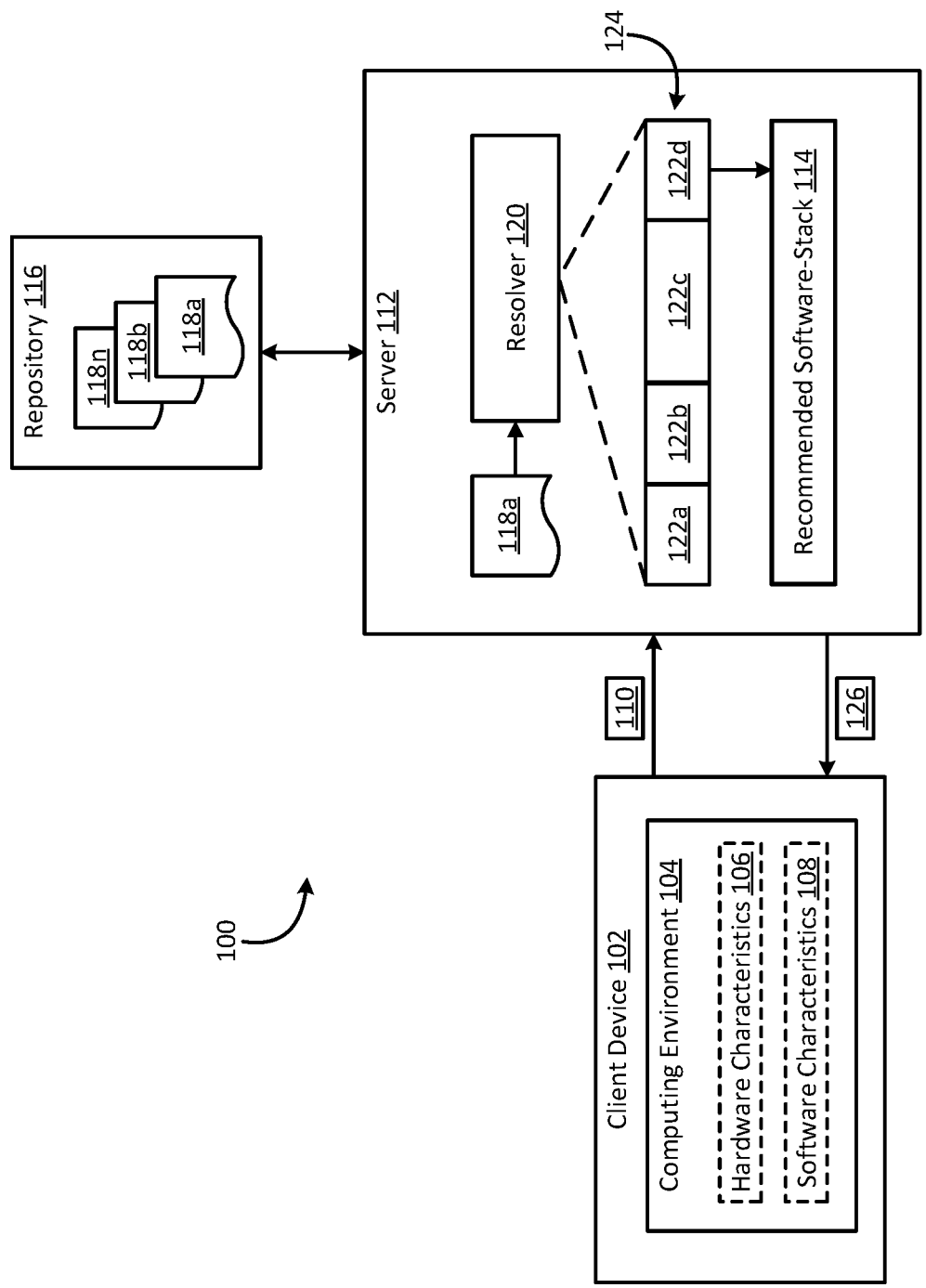
FIG. 1 shows a block diagram of an example of a system for constructing pipelines for implementing a software-stack resolution process according to some aspects of the present disclosure.

A software item such as a software application can rely on one or more libraries or other dependencies for proper operation. There can be many versions of the software item and many versions of each of these dependencies. Additionally, at least some of the dependencies may in turn have their own dependencies that serve as indirect (e.g., transitive) dependencies of the software item. There can also be many versions of those indirect dependencies, and those indirect dependencies may have their own further dependencies. And so on. As a result, there is often a large number of possible combinations of a software item and its dependencies (e.g., direct and indirect dependencies) that can be used in a software stack for the software item. And some of these combinations may perform worse than others. For example, some combinations may introduce defects, assembly problems, or deployment issues that can be time consuming and difficult to identify and resolve. Given the large number of possibilities, it can be challenging to manually identify and test all of the possible combinations of a software item and its dependencies to determine the best software-stack for a software item.

Some examples of the present disclosure overcome one or more of the abovementioned problems via a system that can construct a pipeline based on pipeline configuration data, where the pipeline is configured to implement an automated software-stack identification process for determining a recommended software-stack for a target software item. The pipeline can include a set of software modules connected in series, where the output of one module is the input of the next one. At least some of the software modules can be configurable pipeline units that are customizable in the pipeline configuration data. In particular, the system can select, arrange, and configure the configurable pipeline units based on the pipeline configuration data. This can allow the pipeline to be customized in a variety of ways. To simplify pipeline customization, the system can be configured to ingest pipeline configuration data that is drafted in declarative format or another suitable format that requires little or no programming experience on the part of the drafter. Once the pipeline is constructed, the system can execute the pipeline to automatically evaluate a group of software-stack candidates to determine the recommended software-stack for the target software item.

More specifically, a user can provide input to the system specifying a target software item. The input can also include one or more characteristics of a target computing environment in which the target software item will be executed. The system can then dynamically construct a pipeline corresponding to the target software item based on pipeline configuration data. The system can then execute the pipeline to determine a recommended software-stack for the target software item. In this way, the system can determine a recommended software-stack that is the best for the target computing environment's specific characteristics, relative to the other software-stack candidates, using a customizable pipeline. The system can then output the recommended software-stack, to enable the recommended software-stack to be included (e.g., installed) in the target computing environment.

The pipeline can include a search process that is executable to automatically analyze hundreds or thousands of combinations of the target software item and its dependencies to determine the recommended software-stack for the software item. Some of the configurable pipeline units may be positioned before the search process in the pipeline and some of the configurable pipeline units may be positioned after the search process in the pipeline. Configurable pipeline units positioned before the search process can guide the search process, for example by adjusting parameters of the search process. Examples of such parameters can include inputs to, settings of, and constraints on the search process. Configurable pipeline units positioned after the search process in the pipeline can guide pipeline results, for example by overriding a result of the search process with an alternative result. In this way, the search process and the results thereof are customizable via the pipeline configuration data.

As one particular example, TensorFlow is a popular Python library for building artificial intelligence or machine learning applications. An analysis of different versions of libraries used by TensorFlow 1.11.0 revealed that there are currently approximately 6.39E+27 possible combinations for a TensorFlow application stack (e.g., the TensorFlow package and possible combinations of libraries on which TensorFlow depends). And this is just for version 1.11.0 of TensorFlow. Another version of TensorFlow, version 2.0.0rc0 released on Aug. 23, 2019, currently has approximately 6.58E+35 possible combinations of libraries, which is approximately 1E+8 times more combinations than version 1.11.0. These large numbers just consider libraries. In practice, TensorFlow runs in a computing environment with various software characteristics (e.g., native libraries and packages, cross-ecosystem dependencies, kernel versions, and driver versions) and hardware characteristics (e.g., a CPU type, GPU type, etc.), which can add more complexity to the search. It would likely be impossible to manually determine and test all of the possible combinations for all of the TensorFlow versions to verify application behavior. Additionally, Tensorflow's dependencies can be dynamic and change with time, for example as new releases of dependencies become available or existing versions of dependencies become unavailable. This makes it even harder to test all of the possible combinations for all of the TensorFlow versions to verify application behavior. But some examples of the present disclosure can overcome one or more of the abovementioned problems by constructing a pipeline of configurable pipeline units based on pipeline configuration data, where the pipeline is executable to automatically determine a recommended software-stack for Tensorflow.

As noted above, the pipeline can include a search algorithm configured to perform a search on a search space containing many or all possible combinations of a target software item, like TensorFlow and its dependencies. The search algorithm can be a heuristic search algorithm, such as a Monte-Carlo tree-analysis algorithm or a temporal-difference learning algorithm; a stochastic search algorithm, such as a simulated annealing algorithm; or another type of algorithm. The search algorithm may learn or be guided over time (e.g., between iterations) to more rapidly converge towards solutions, without having to test all of the possible combinations defined in the search space. This type of searching can be referred to as a combinatorial optimization problem, in which a space is searched for a local maximum or minimum that best satisfies an objective function. By solving this combinatorial optimization problem, the system may rapidly determine a group of software-stack candidates that are most likely to yield the best results, where each of the software-stack candidates in the group has a unique combination of the software components in the search space. The group of software-stack candidates may be a relatively small subset of the total number of software-stack combinations that can be generated using all of the software components in the search space. For example, the group may include 100 thousand software-stack candidates, which may be a relatively small subset of the 10 million total possibilities. In this way, the system has significantly reduced the amount of software-stack candidates that will undergo further analysis.

In some examples, the search process can take into account various factors by using one or more scoring functions. For example, the scoring functions can take into account the characteristics (e.g., the hardware characteristics and software characteristics) of a target computing environment on which the target software item is to be executed. The scoring functions may additionally or alternatively take into account security properties of the target software item and each of its dependencies. Additionally or alternatively, the scoring functions can take into account performance properties of the target software item and each of its dependencies. The scoring functions may also take into account other factors. Using one or more scoring functions to characterize each of the software-stack candidates in this way can be faster and less resource-intensive than building and testing each of the software-stack candidates to verify application behavior. Based on the scores assigned to the software-stack candidates, the search process select one of the software-stack candidates from the group. For example, the search process can select whichever software-stack candidate in the group has the highest score or the lowest score, depending on the scoring function. The selected software-stack may be the best software stack for a given computing environment relative to the rest of the software-stack candidates in the group.

After a software stack is selected using the search process, the system may then provide the selected software-stack as input to the next software module in the pipeline. In some examples, the next module in the pipeline may be a configurable pipeline unit. The configurable pipeline unit can be configured to modify, replace, or otherwise process the selected software-stack. The output from the configurable pipeline unit can then be provided as input to the next software module, and so on until execution of the pipeline is complete. Once execution of the pipeline is complete, the system can transmit an output indicating the recommended software-stack to a user, who can install the recommended software-stack on a computing device.

In some examples, the recommended software-stack can be for building the target software item (e.g., rather than for running the target software item on a target computing device). For example, the recommended software-stack can include software components that are to be included in a build process for building the target software item using a build tool. The system can determine the recommended software-stack based on the characteristics of a target computing environment, which in this example can be a target build environment. Regardless of whether the recommended software-stack is configured for running or building the target software item, the recommended software-stack can be determined by executing the pipelines described herein.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for constructing pipelines for implementing software-stack resolution process according to some aspects of the present disclosure. The system 100 includes a client device 102, such as a laptop computer, desktop computer, or mobile device (e.g., smartphone, tablet, or e-reader). The client device 102 can include a computing environment 104 for a target software item. Examples of the computing environment 104 can include a runtime environment or a build-time environment. The computing environment 104 may have certain characteristics, such as hardware characteristics 106 and software characteristics 108. Examples of the hardware characteristics 106 can include the number and types of processors, non-volatile memory, and volatile-memory supporting the computing environment 104. Examples of the software characteristics 108 can include the operating system and libraries in the computing environment 104.

In some examples, the client device 102 can transmit a request to a server 112. The request can serve as an input 110 indicating a target software item and a characteristic of the computing environment 104 in which the target software item is to be executed. The input 110 may not include a version indicator for the target software item, but may rather refer to the target software item more generally. The server 112 can receive the input 110 and responsively execute a pipeline 124 to determine a recommended software-stack 114 for the target software item. The recommended software-stack 114 can include a recommended version of the target software item and one or more recommended dependencies of the target software item, where such dependencies may be direct or indirect dependencies of the target software item. The server 112 can then generate an output 126 indicating the recommended software-stack 114 and provide the output 126 to the client device 102. A user of the client device 102 may receive the output 126 (e.g., via a display of the client device 102) and install the recommended software-stack 114. Alternatively, the client device 102 can automatically install the recommended software-stack 114, in some examples.

To generate the pipeline 124, the server 112 can begin by obtaining a pipeline configuration file 118a associated with the input 110 (e.g., the target software item). The server 112 can obtain the pipeline configuration file 118a from a repository 116 of pipeline configuration files 118a-n, where each of the pipeline configuration files 118a-n can be for constructing a pipeline for implementing software-stack resolution process. In some examples, there can be multiple pipeline configuration files 118a-c that correspond to the same target software item but that are configured to construct the pipeline 124 in different ways (e.g., to have a different order of, or settings for, configurable pipeline units). The pipeline configuration file 118a can define an order for, and settings of, one or more configurable pipeline units to be included in the pipeline 124. Fixed pipeline units can also be included in the pipeline 124. Each pipeline unit (e.g., configurable or fixed) is a software module configured to perform one or more computing operations in the pipeline 124. These software modules are separate from the pipeline configuration file 118a and can be programmed in any suitable programming language, such as Java, C++, or Python.

The server 112 can then execute a resolver 120 to construct a pipeline 124 formed from pipeline units 122a-d. The resolver 120 can be software configured to ingest the pipeline configuration file 118a and generate the pipeline 124 based on the pipeline configuration data in the pipeline configuration file 118. The resolver 120 can organize the pipeline units 122a-d in a sequence to form the pipeline 124, such that the output of one pipeline unit serves as an input to the next pipeline unit in the sequence. The order of the pipeline units 122a-d in the sequence can depend on the pipeline configuration data in the pipeline configuration file 118a. For example, the pipeline configuration data can specify the types and sequence of pipeline units 122a-b to be included in the pipeline 124. The resolver 120 can extract this information from the pipeline configuration data and, based on thereon, determine that pipeline units 122a-b are to be included in the pipeline 124 and an order for the pipeline units 122a-b. Some of the pipeline units 122a-d may be configurable via the pipeline configuration file 118a and others may not be configurable via the pipeline configuration file 118a. Pipeline units that are configurable via the via the pipeline configuration file 118a are referred to herein as configurable pipeline units, whereas pipeline units that are not configurable via the via the pipeline configuration file 118a are referred to herein as fixed pipeline units.

At least one of the pipeline units 122c in the pipeline 124 is configured to implement a search process. Such a pipeline unit 122c can be referred to herein as a searching unit. Other pipeline units 122a-b and 122d can be positioned around the searching unit 122c in the pipeline 124 in order in influence aspects of the search process, such as the parameters of and outputs from the search process.

The searching unit 122c can implement the search process at least in part by executing a search algorithm, such as a heuristic search algorithm, a stochastic search algorithm, or another type of search algorithm. The search algorithm can be executed to recursively analyze direct and indirect dependencies of the target software item to develop a search space containing various combinations of the target software item and its dependencies. These combinations may include different versions of the target software item and different mixtures and versions of the dependencies. Each element in the search space can correspond to a unique combination of a specific version of the target software item and the dependencies of that version. The search space can then be searched based on an objective function. In some examples, the search algorithm can learn over time (e.g., between iterations) to more rapidly converge towards a solution to the objective function, without having to analyze every element or combination of elements in the search space. This can reduce the practical magnitude of the search space, exponentially reducing the amount of computational time and resources required to perform the search. By performing the search, the searching unit 122c can determine a group of software-stack candidates, where each software-stack candidate in the group corresponds to a unique combination of the target software item and its dependencies.

In some examples, the search process can involve determining scores corresponding to the software-stack candidates using a scoring function. A respective score can be determined for each respective software-stack candidate using the scoring function. The scoring function can be a predefined algorithm that can take into account a variety of factors. For example, the scoring function can take into account the hardware characteristics 106 and the software characteristics 108 of the computing environment 104, security properties of the target software item, security properties of one or more dependencies of the target software item, performance properties of the target software item, performance properties of one or more dependencies of the target software item, or any combination of these. Other factors may also be used by the scoring function. The scoring function may weight some factors more heavily than others. The scoring function can be applied to each software-stack candidate to determine its corresponding score. After generating the scores for the software-stack candidates, the searching unit 122c can select one of the software-stack candidates based on its corresponding score. The searching unit 122c can select the software-stack candidate based on its corresponding score having a certain predefined attribute, such as the corresponding score being the maximum or minimum score among all of the scores. If the searching unit 122c is the last pipeline unit in the pipeline 124, the selected software-stack candidate may serve as the recommended software-stack 114. Otherwise, the selected software-stack candidate can be passed as input to the next pipeline unit, which in the example shown in FIG. 1 would be pipeline unit 122d.

After determining the recommended software-stack 114, the server 112 can generate an output 126 indicating the recommended software-stack 114. The server 112 can transmit the output 126 to the client device 102 as an electronic communication over a network, such as a local area network or the Internet. The client device 102 can receive the output 126 and perform one or more operations in response to the output 126. For example, the client device 102 can provide the output 126 to a user via a display, which may be a liquid crystal display (LCD) or a light-emitting diode (LED) display. This can enable the user to control the installation of the recommended software-stack 114 in the computing environment 104 manually. As another example, the client device 102 can automatically obtain the necessary files to install the recommended software-stack 114 in the computing environment 104 and automatically perform some or all of the installation process.

While the example that is shown in FIG. 1 depicts a specific number and arrangement of components for simplicity, other examples may include more components, fewer components, different components, or a different arrangement of the components shown in FIG. 1. For instance, in another example the computing environment 104 can be positioned in another location of the system 100, such as on the server 112 or on a computing device that is external to the client device 102. And it will be appreciated that a single component block depicted in FIG. 1 can represent one or more of such components. For example, the client device 102 can represent any number and combination of client devices and the server 112 can represent any number and combination of servers.

Figure 2:
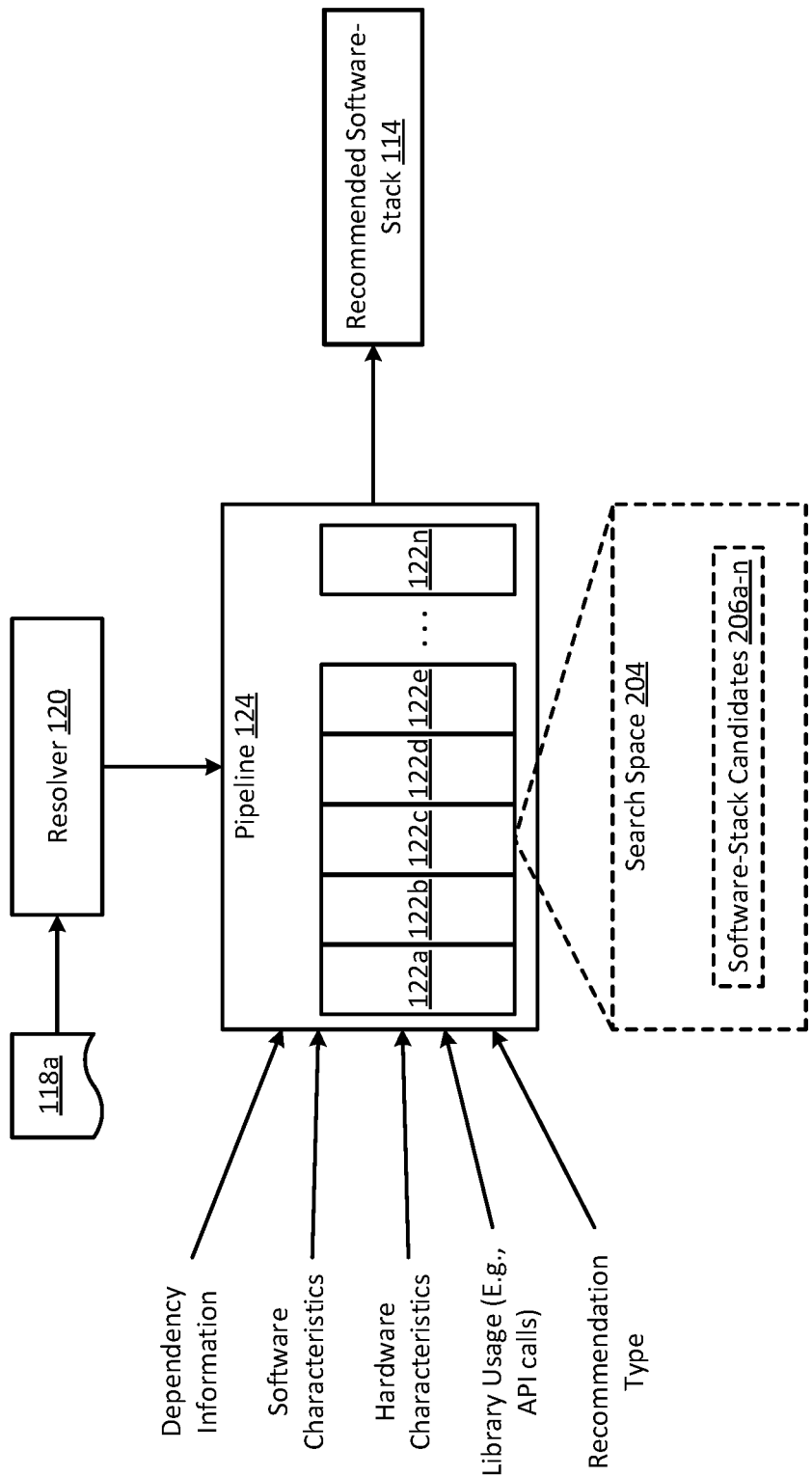
FIG. 2 shows a block diagram of an example of a pipeline according to some aspects of the present disclosure.

FIG. 2 shows a block diagram of an example of a pipeline 124 according to some aspects of the present disclosure. The pipeline 124 can be constructed by the resolver 120 based on a pipeline configuration file 118a. The pipeline 124 can include any number and combination of pipeline units 122a-n. At least one of the pipeline units 122c can be a searching unit and a remainder of the pipeline units can be positioned before and after the searching unit 122c for influencing the recommendation output by the pipeline 124.

Various inputs can be supplied to the pipeline 124 for determining a recommended software-stack 114 for a target software item. Examples of such inputs can include dependency information describing dependencies of the target software item, software characteristics of a target computing environment on which the target software item is to be deployed, hardware characteristics of the target computing environment, library usage information, and a type of recommendation for the pipeline 124 to provide. The recommendation type can add context to the search process so that the resultant recommendation has certain desired characteristics. Examples of recommendation types can include "latest", "performance," "security," "stable," and "testing." A recommendation type of "latest" can be configured for causing the pipeline 124 to try to resolve a software stack with the latest set of packages. A recommendation type of "performance" can be configured for causing the pipeline 124 to try to resolve a software stack with the highest performance quality as compared to other candidate software-stacks. This may be achieved by including certain updates or patches in the software stack. A recommendation type of "security" can be configured for causing the pipeline 124 to try to resolve a software stack with the highest level of cybersecurity as compared to other candidate software-stacks. This may be achieved by including certain updates or patches in the software stack. A recommendation type of "stable" can be configured for causing the pipeline 124 to try to resolve the most-stable software stack as compared to other candidate software-stacks. This may be achieved by including only packages deemed stable in the software stack. A recommendation type of "testing" can be configured for causing the pipeline 124 to try to resolve a software stack for use in testing purposes, where the software stack may not be fully tested and inspected for quality. Of course, these recommendation types are intended to be illustrative and non-limiting. Other examples may involve more, fewer, or different recommendation types than those described above.

The pipeline units 122a-n can use the inputs to determine the recommended software-stack 114 for the target software item. For example, one or more of the above inputs can be provided to the searching unit 122c for use in generating or refining a search space 204 of software-stack candidates 206a-n. Additionally or alternatively, one or more of the above inputs can be provided to a scoring function for use in selecting among the software-stack candidates 206a-n.

Figure 3:
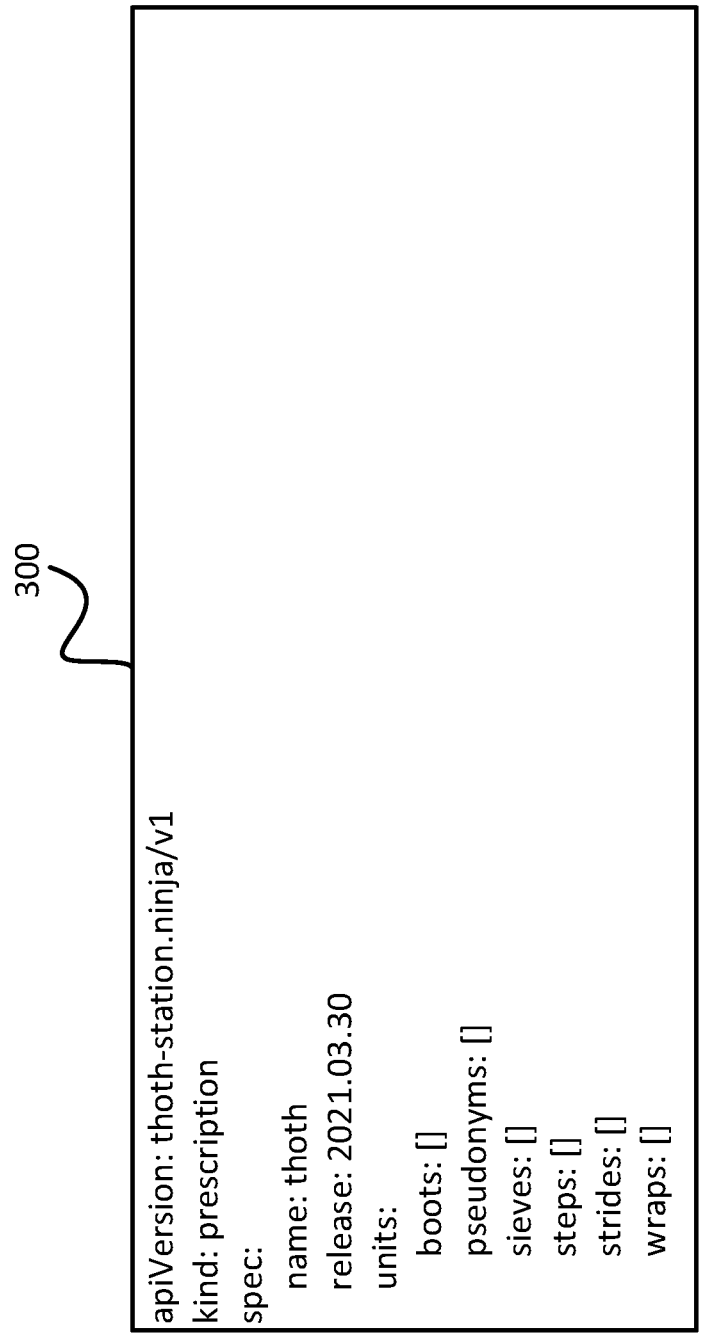
FIG. 3 shows an example of pipeline configuration data according to some aspects of the present disclosure.

FIG. 3 shows an example of pipeline configuration data 300 according to some aspects of the present disclosure. The pipeline configuration data 300 can be stored in any suitable data structure, such as the pipeline configuration file 118 of FIG. 1. In this example, the pipeline configuration data 300 includes text in a declarative format, in particular a YAML format. But other declarative formats, such as a JSON format, can be used. Using a declarative format for the pipeline configuration data 300 may simplify usage of the system, for example for individuals without programming experience. But, other formats may alternatively be used for the pipeline configuration data 300.

As shown, the pipeline configuration data 300 can include an API version, a kind, and a specification section. Because different pipeline configuration data 300 can correspond to different API versions that may have different semantics or different feature sets, it may be desirable to specify the API version corresponding to the pipeline configuration data 300 to prevent compatibility problems. The kind field indicates that the pipeline configuration data 300 defines a prescription, which is a file type that describes features of a software-stack resolution pipeline. Specifying a kind can help a computing environment, such as Kubernetes, differentiate the pipeline configuration data 300 from other types of configuration data. The specification section indicates a name and a version number of the resolver that will ingest the pipeline configuration data 300, which may also help prevent compatibility problems. The specification section also identifies which pipeline units, and the order the pipeline units, that are to be included in the pipeline.

There can be multiple different types of configurable pipeline units described in the pipeline configuration data 300. Examples of the pipeline units can include boots, pseudonyms, sieves, steps, strides, and wraps. Other types of pipeline units may also be described in the pipeline configuration data 300. The pipeline units can be described in the pipeline configuration data 300 according to a predefined schema, which can also have a declarative format.

Figure 4:
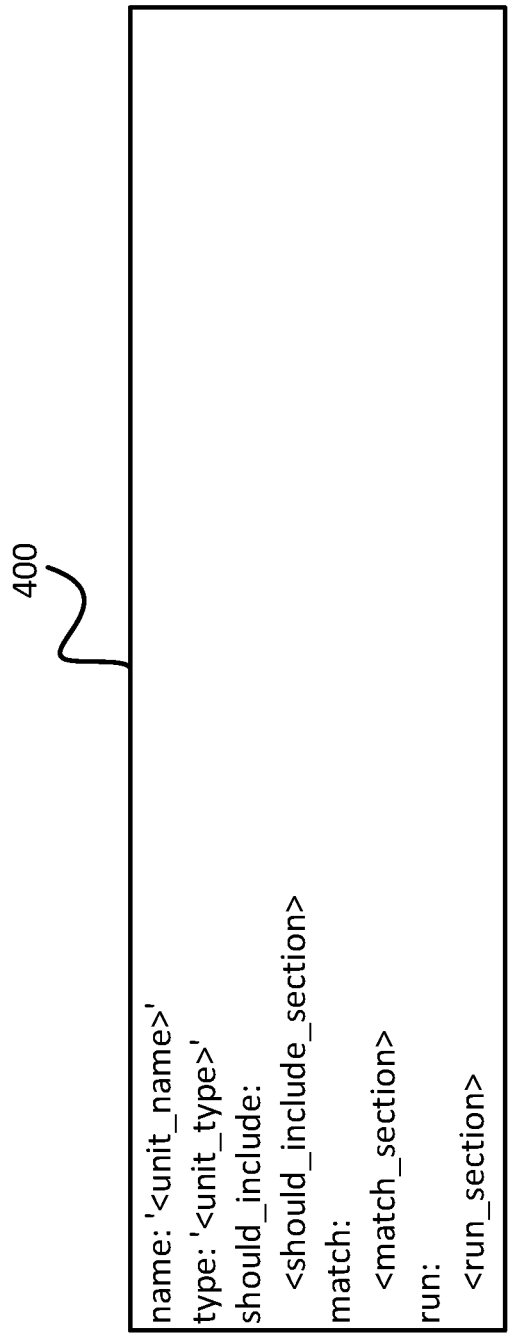
FIG. 4 shows an example of a schema for defining a configurable pipeline unit according to some aspects of the present disclosure.

One example of the predefined schema 400 for describing a pipeline unit is shown in FIG. 4. Each pipeline unit can be described in the pipeline configuration data 300 using this schema 400. As shown, the schema 400 indicates a name and type of the pipeline unit. The name can uniquely identify the pipeline unit. The type field can indicate a type of the pipeline unit, which in some examples can be one of the types listed above: boots, pseudonyms, sieves, steps, strides, and wraps. Also included are a "should_include" section, a "match" section, and a "run" section.

The "should_include" section can include various fields for customizing whether the pipeline unit is to be included in a pipeline and where the pipeline unit is to be included in the pipeline. For example, the fields can indicate that the pipeline unit is only to be included in the pipeline if certain library calls are present. Based on such a setting, the pipeline unit may only be included in the pipeline if certain parts of a library are used that affect the target software item. As another example, the fields can be set to indicate dependencies on other pipeline units. Such dependencies (e.g., other pipeline units) may be pre-requisites for the pipeline unit to be included in the pipeline. As yet another example, the fields can indicate a label associated with the pipeline unit. Labels can be a mechanism to register pipeline units so that they are only included in pipelines for which the corresponding requests include a given label. This may allow certain requests that include a particular label to invoke certain pipeline units, whereas other requests that lack the particular label may not invoke those pipeline units. As still another example, the fields can indicate characteristics of a target runtime environment (e.g., a particular operating system, compiler, platform, and/or hardware component) for which the pipeline unit should be included in the pipeline. The pipeline unit may not be included in the pipeline if the target runtime environment does not have the specified characteristics. Other fields may additionally or alternatively be included in the "should_include" section.

The "match" section allows for one or more software packages to be specified that must be dependencies (e.g., direct dependencies) of the target software item for the pipeline unit to be included in the pipeline. For example, the "match" section can include the package name "flask," indicating that the flask package must be a dependency of the target software item for the pipeline unit to be included in the pipeline. The "match" section can alternatively indicate multiple packages, such as flask and numpy, which are to be dependencies of the target software item for the pipeline unit to be included in the pipeline. In this way, the pipeline unit can be customized such that it is only included in certain pipelines associated with the certain packages.

The "run" section can allow for certain information to be logged for a user, which may aid with debugging or deployment. The "run" section can include one or more entries, where each entry can have one or more of the following attributes: a type, a message, and a link. Examples of the types can include a warning, an error, or an informational output. The message can be a textual message to be output for a user. The link can point to a webpage or document that provides additional details about the message. The "run" section can also allow for certain actions to be performed by the pipeline unit when one or more of the conditions specified in the "match" section occur during the search process. This can allow the behavior of a pipeline unit to be customized, so that certain actions are performed by the pipeline unit in response to certain matched conditions.

The pipeline configuration data 300 can include a subsection for each pipeline unit that defines a configuration of the pipeline unit in accordance with the schema 400 shown in FIG. 4. The subsections can also be referred to as definitions. In some examples, the order of the definitions in the pipeline configuration data 300 may dictate the sequence of the corresponding pipeline units in the pipeline. For instance, the resolver may arrange the pipeline units in the same order that they are described in the pipeline configuration data 300. In other examples, the pipeline configuration data 300 can include a list that is separate from the definitions, where the list defines an order of the pipeline units in the pipeline. The order may be different from the order in which the definitions are described in the pipeline configuration data 300. Based on the list, the resolver can arrange the pipeline units in the proper order.

Although FIGS. 3-4 show a certain number and arrangement of fields for the pipeline configuration data 300 and the pipeline-unit schema 400 respectively, these are intended to be illustrative and non-limiting. Other examples may include more fields, fewer fields, different fields, or a different arrangement of the fields shown in FIGS. 3-4.

FIGS. 5-10 show examples of definitions for a boot unit, a pseudonym unit, a sieve unit, a step unit, a stride unit, and a wrap unit, respectively. These are examples of different types of pipeline units that can be included in the pipeline. But other examples may include more, fewer, or different types of pipeline units.

Referring now to FIG. 5, the pipeline configuration data can include a definition 500 for a boot unit. A boot unit can be a pipeline unit that is positioned before the search process in the pipeline, for example as the first pipeline unit in the pipeline. The boot unit can check input values (e.g., user inputs, parameters, or hyperparameters) to the pipeline for proper syntax and content, adjust the input values, halt execution of the pipeline in response to detecting an undesired condition, and print error messages to a logger. As shown, the definition 500 of FIG. 5 indicates that the name for the pipeline unit is "BootUnit" and the type is "boot." The definition 500 also includes a "match" section specifying the flask package. The definition 500 further includes a "run" section specifying certain error and logging conditions.

As one particular example, a user may supply characteristics of a target computing environment for a target software item as input to the pipeline. The boot unit can analyze the characteristics to determine whether they are described in a preexisting database used by the pipeline to implement certain functionality, such as the search process. If the characteristics are not described in the database, it may mean that subsequent pipeline units that are reliant on such database information would not function properly or would produce undesirable results. In these circumstances, the boot unit may adjust the characteristics to prevent the error, for example by replacing hardware component (e.g., a CPU/GPU of the target computing environment) that is not described in the database with another hardware component that is described in the database. Alternatively, the boot unit can halt execution of the pipeline and output a corresponding notification to prevent the error.

Figure 6:
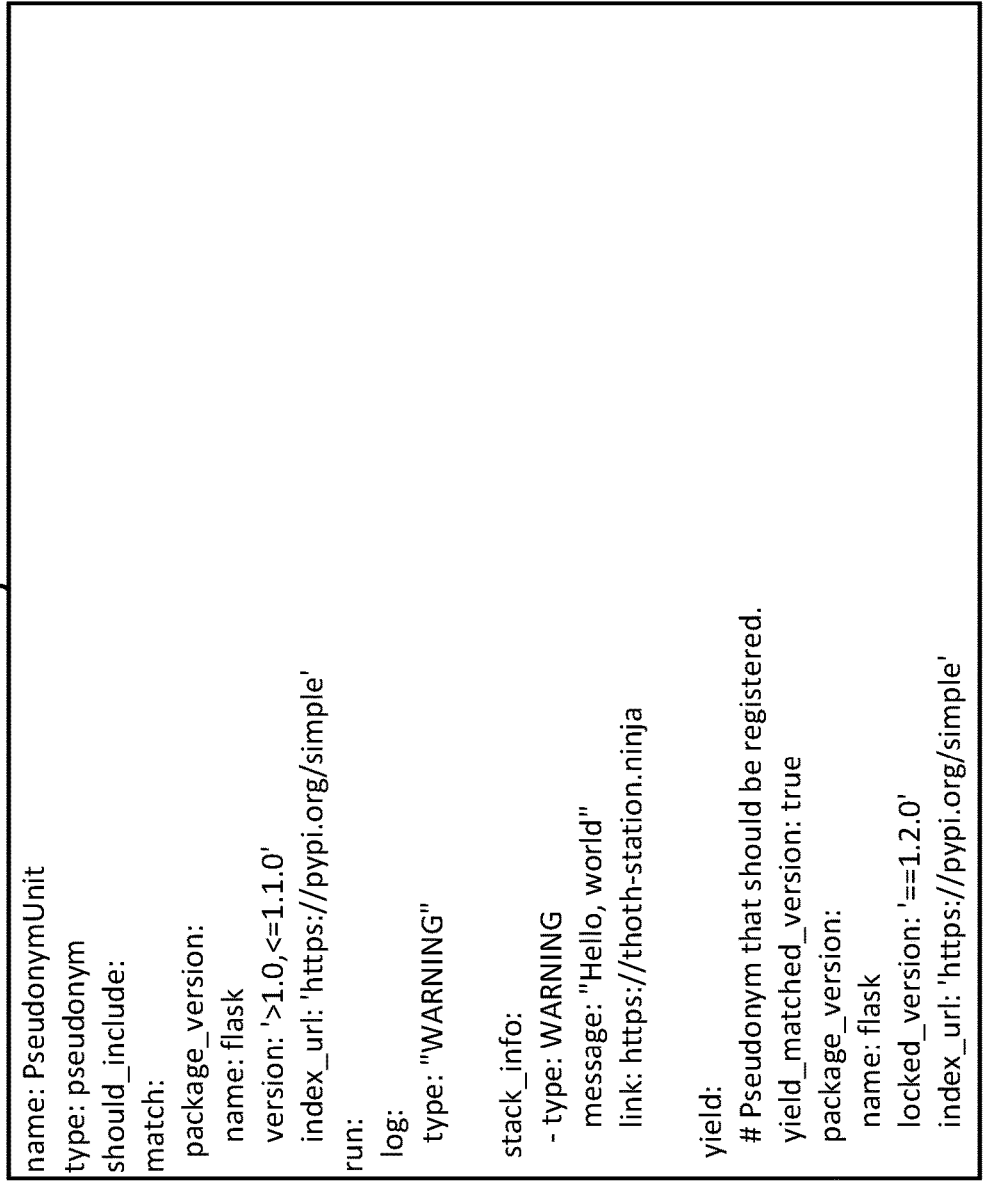
FIG. 6 shows an example of a definition for a pseudonym unit that can be included in the pipeline according to some aspects of the present disclosure.

Referring now to FIG. 6, the pipeline configuration data can include a definition 600 for a pseudonym unit. The pseudonym unit can allow for package alternatives to be analyzed and potentially included in the software stack. For example, if the "intel-tensorflow" package provides the same or similar functionality as the "tensorflow" package, the "intel-tensorflow" package can be considered a viable alternative in the software stack, and thus it would be desirable to consider the "intel-tensorflow" package in search process. The pseudonym unit can allow for these types of package substitutions and alternatives to be considered in the pipeline.

As one particular example, it may be desirable to substitute all tensorflow packages in the software stack with their intel-tensorflow counterparts (e.g., to improve functionality or stability). Adding a pseudonym unit to the pipeline can allow for this substitution to occur. As another example, it may be desirable to replace TensorFlow v. 2.2.20 in the software stack with TensorFlow v. 2.1.0, even though the search process selected TensorFlow v. 2.2.20 for use in the software stack. A pseudonym unit in the pipeline can make such substitutions.

As shown, the definition 600 indicates that the name for the pipeline unit is "PseudonymUnit" and the type is "pseudonym." The definition 600 also includes a "match" section specifying a package and version for which a pseudonym (e.g., an alternative package) is to be registered. The definition 600 further includes a "run" section specifying certain error and logging conditions. The "yield" portion of the "run" section registers a pseudonym for the package described in the "match" section. In this example, the "yield" portion indicates that the flask versions specified in the "match" section should be replaced in the software stack with flask version 1.2.0.

Referring now to FIG. 7, the pipeline configuration data can include a definition 700 for a sieve unit. The sieve unit can filter out libraries and packages (e.g., certain types or versions of packages) that should not be present in the resulting software stack. For example, it may be desirable to ensure that certain libraries or packages are excluded from the final software stack. This may be because the libraries or packages are outdated, deprecated, have security vulnerabilities, result in installation failures, have runtime issues, etc. Adding a sieve unit to the pipeline can allow for such filtering to occur.

As one particular example, it may be desirable to filter out legacy Python2 packages that fail to install in Python3 environments. Additionally or alternatively, it may be desirable to filter out Python packages that have runtime issues or that use a certain package index that is not allowed in certain restricted environments. A sieve unit to the pipeline can filter (e.g., exclude) such packages from the resulting software stack identified by the pipeline.

As shown, the definition 700 indicates that the name for the pipeline unit is "SieveUnit" and the type is "sieve." The definition 700 also includes a "match" section specifying a package and version (e.g., version range) that is to be filtered out of the resulting software stack. The definition 700 further includes a "run" section specifying certain error and logging conditions.

Referring now to FIG. 8, the pipeline configuration data can include a definition 800 for a step unit. In some examples, the step unit can add libraries and packages (e.g., certain types or versions of packages) to the resulting software stack. For example, it may be desirable to ensure that certain libraries or packages are included in the final software stack. This may be because the libraries or packages are required to prevent installation failures, runtime issues, etc. Adding a step unit to the pipeline can allow for such additions to be incorporated into the pipeline. Step units may also help to assign a score to actions performed during the search process to identify an optimal software stack.

As one particular example, it may be desirable to add package B to the software stack every time package A is included in the software stack, for example to mitigate a security vulnerability in package A. Adding a step unit to the pipeline can allow for package B to be automatically included in the software stack every time package A is included in the software stack.

As shown, the definition 800 indicates that the name for the pipeline unit is "StepUnit" and the type is "step." The definition 800 also includes a "match" section specifying a package and version (e.g., version range) that is to be added to the resulting software stack. Also specified is a state to be resolved in the search space. If the specified state is resolved in the search space, a described action is performed by the step unit. In this example, if the werkzeug dependency is resolved in the search process, an action described in the "run" section of the definition 800 should be performed. The definition 800 further includes the "run" section specifying certain actions, error conditions, and logging conditions.

Referring now to FIG. 9, the pipeline configuration data can include a definition 900 for a stride unit. The stride unit can determine whether the resolved software stack is acceptable according to one or more predefined criteria. For example, it may be desirable to ensure that the resolved software stack has a certain dependency, such as werzeug v. 1.0.0. If it does not, the stride unit can indicate that the resulting software stack is unacceptable and discard it.

As shown, the definition 900 indicates that the name for the pipeline unit is "StrideUnit" and the type is "stride." The definition 900 also includes a "match" section indicating that a particular dependency (e.g., werzeug v. 1.0.0) must be included in the final software stack. The definition 900 further includes a "run" section specifying certain error and logging messages to be output if the dependency in the "match" section is not present in the final software stack.

Figure 10:
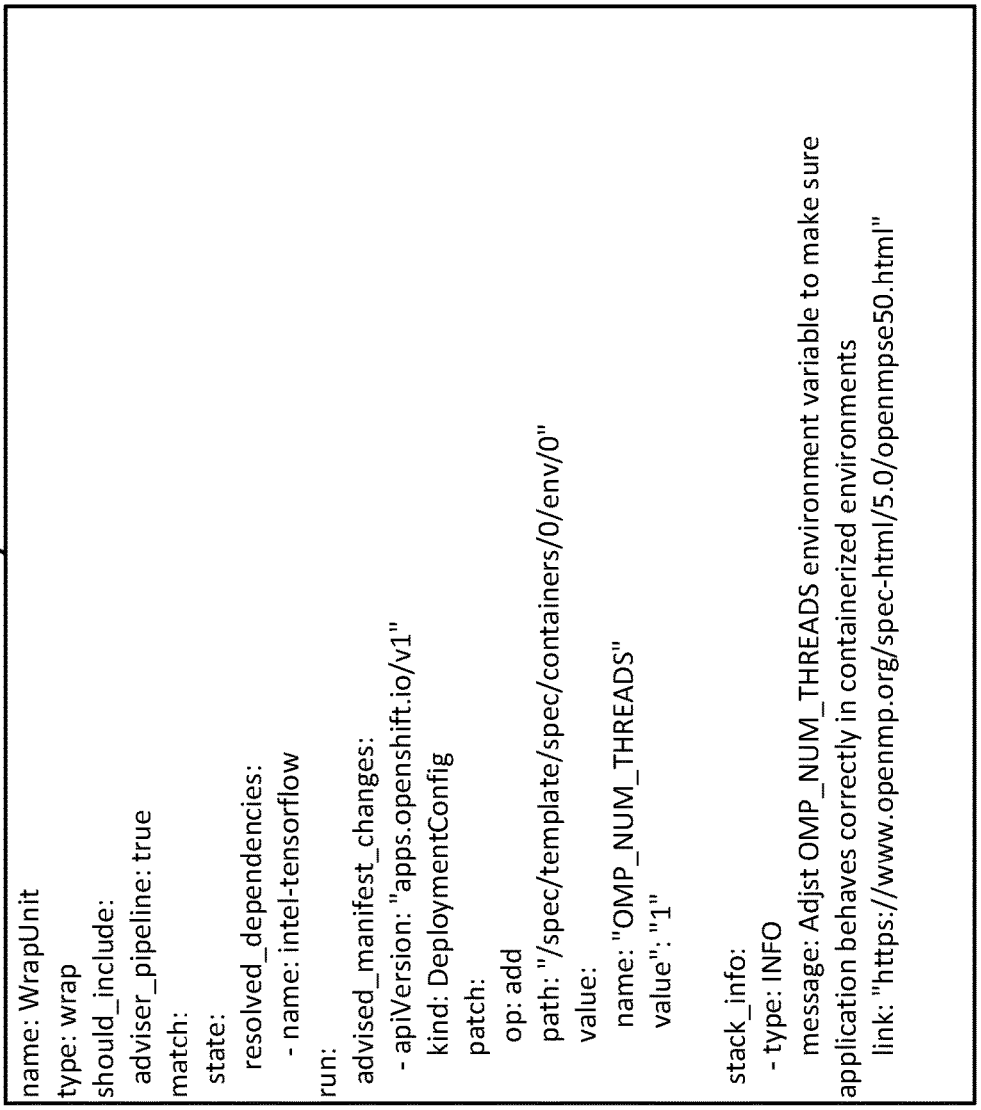
FIG. 10 shows an example of a definition for a wrap unit that can be included in the pipeline according to some aspects of the present disclosure.

Referring now to FIG. 10, the pipeline configuration data can include a definition 1000 for a wrap unit. The wrap unit can perform one or more operations based on the final software stack accepted by the stride units. For example, the wrap unit can add a justification to the final software stack, recommend changes to environment variables and other characteristics of a runtime environment, or register a callback function to be called once a certain software stack is identified. As one particular example, the wrap unit can suggest that Python 3.8 be used when running the software stack on Red Hat Enterprise Linux (RHEL) version 8.0, because Python 3.8 can provide some performance improvements in that context.

As shown, the definition 1000 indicates that the name for the pipeline unit is "WrapUnit" and the type is "wrap." The definition 1000 also includes a "match" section indicating one or more dependencies (e.g., intel-tensorflow) that must be included in the final software stack for the wrap unit to be run. The definition 900 further includes a "run" section specifying certain error and logging messages. The "run" section also includes an "advised_manifest_changes" portion, which can suggest changes to manifest files used for deployment. In FIG. 10, the advised_manifest_changes portion can suggest that the environment variable OP-NUM-THREADS be set to one, which can help make sure that the application behaves correctly in containerized environments.

It will be appreciated that the features and functions of the various pipeline units described are intended to be illustrative and non-limiting. In other examples, each of the pipeline units described above may implement more, less, or different functionality. Other pipeline units may also be included in the pipeline. For example, the system may be extensible such that a user may program or download a custom pipeline unit for inclusion in the pipeline. The user can then incorporate a definition for the custom pipeline unit in the pipeline configuration data, so that the custom pipeline unit is included in the pipeline.

Figure 11:
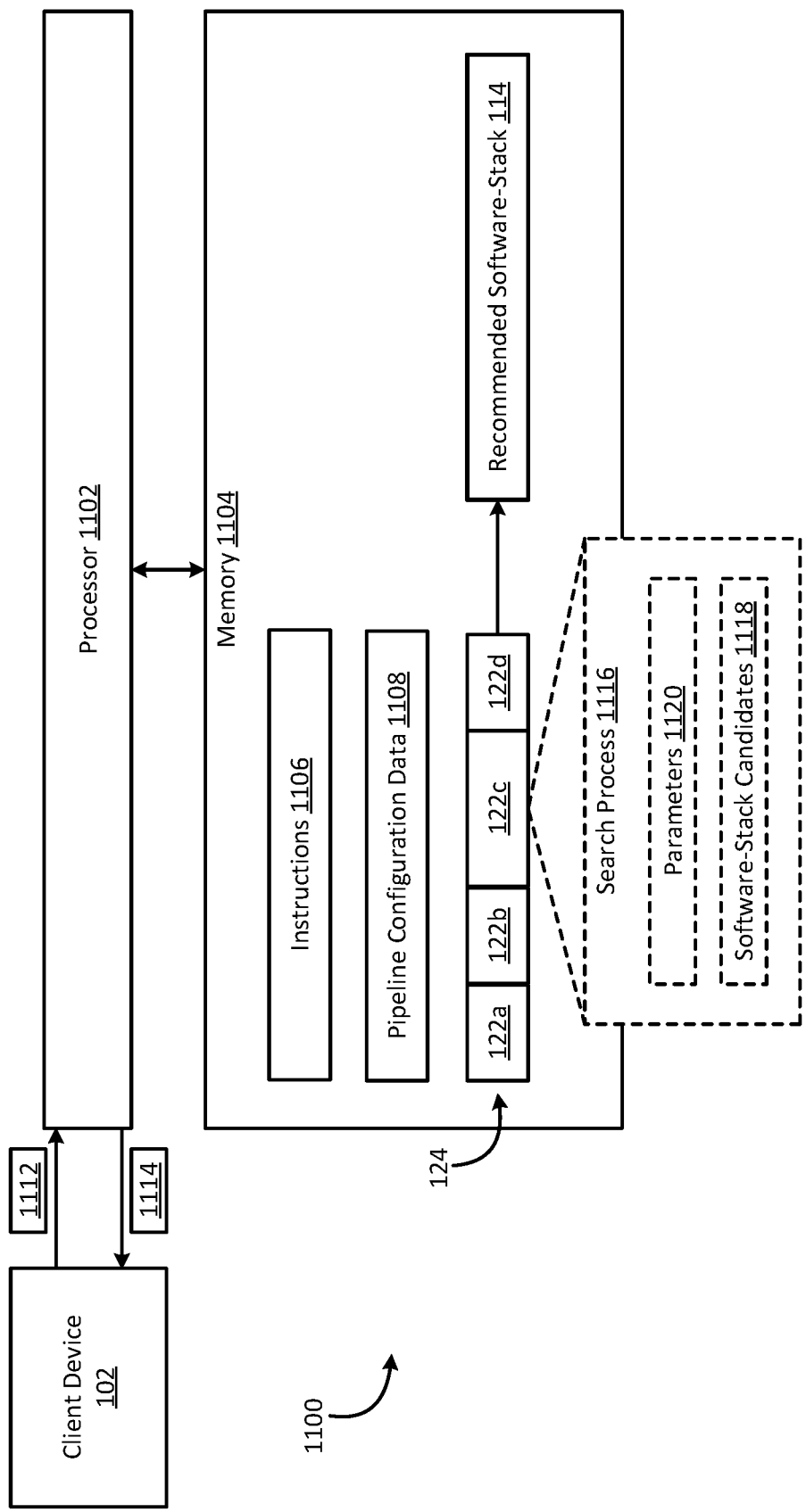
FIG. 11 shows a block diagram of another example of a system for constructing pipelines for implementing a software-stack resolution process according to some aspects of the present disclosure.

FIG. 11 is a block diagram of another example of a system 1100 for constructing pipelines for implementing a software-stack resolution process according to some aspects of the present disclosure. The system 200 includes a processor 1102 communicatively coupled with a memory 1104. In some examples, the processor 1102 and the memory 1104 can be included in the same housing (e.g., in the server 112 of FIG. 1) or remote from one another.

The processor 1102 can include one processor or multiple processors. Examples of the processor 1102 include a Field-Programmable Gate Array (FPGA), an application-specific integrated circuit (ASIC), a microprocessor, or any combination of these. The processor 1102 can execute instructions 1106 stored in the memory 1104 to perform operations. In some examples, the instructions 1106 can include processor-specific instructions generated by a compiler or an interpreter from code written in any suitable computer-programming language, such as C, C++, C#, etc.

The memory 1104 can include one memory or multiple memories. In some examples, the memory 1104 can be non-volatile such that it retains stored information when powered off. For instance, the memory 1104 can include electrically erasable and programmable read-only memory (EEPROM), flash memory, or any other type of non-volatile memory. At least some of the memory 1104 includes a non-transitory computer-readable medium from which the processor 1102 can read instructions 1106. A computer-readable medium can include electronic, optical, magnetic, or other storage devices capable of providing the processor 1102 with computer-readable instructions or other program code. Examples of a non-transitory computer-readable medium can include magnetic disk(s), memory chip(s), ROM, random-access memory (RAM), an ASIC, a configured processor, optical storage, or any combination of these.

In some examples, the processor 1102 can execute the instructions 1106 to perform operations. For example, the processor 1102 can receive a request 1112 from a client device 102 for a recommended software-stack 114 for a target software item. The request 1112 can include any number of inputs, such as any of the inputs described above with respect to input 110 of FIG. 1. The processor 1102 can also receive pipeline configuration data 1108 specifying configurable pipeline units (e.g., pipeline units 122a-b, 122d) to be included in a pipeline 124 for selecting the recommended software-stack 114 for the target software item. The pipeline can include a search process 1116 for identifying and analyzing a plurality of software-stack candidates 1118 associated with the target software item. The processor 1102 can construct the pipeline 124 using the configurable pipeline units based on the pipeline configuration data 1108. One or more pipeline units of the configurable pipeline units can be arranged in the pipeline 124 to guide the search process 1116 by adjusting one or more parameters 1120 of the search process 1116. The processor 1102 can execute the pipeline 124 to select a particular software-stack candidate from among the plurality of software-stack candidates 1118 as the recommended software-stack 114. The processor 1102 can then transmit a response 1114 to the client device 102 indicating the recommended software-stack 114 for the target software item.

Figure 12:
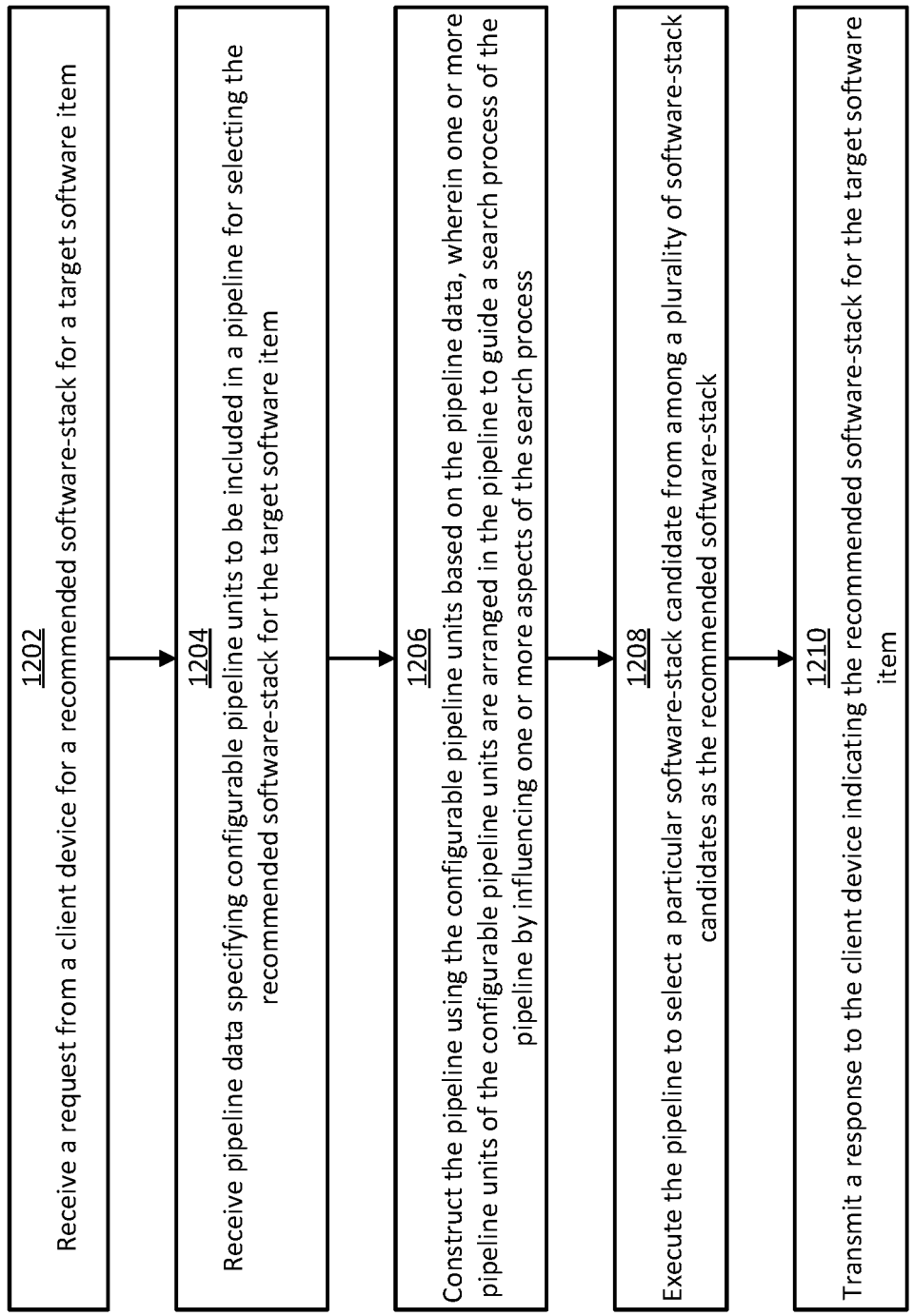
FIG. 12 shows a flow chart of an example of a process for constructing pipelines for identifying a recommended software-stack according to some aspects of the present disclosure.

In some examples, the processor 1102 can implement some or all of the steps shown in FIG. 12. Other examples can include more steps, fewer steps, different steps, or a different order of the steps than is shown in FIG. 12. Some or all of the steps may be repeated. The steps of FIG. 12 are discussed below with reference to the components discussed above from FIG. 11.

In block 1202, the processor 1102 receives a request 1112 from a client device 102 for a recommended software-stack 114 for a target software item. The processor 202 can receive the request 1112 as an electronic communication via a network, such as a local area network or the Internet.

In block 1204, the processor 1102 receives pipeline configuration data 1108 specifying configurable pipeline units (e.g., pipeline units 122a-b, 122d) to be included in a pipeline 124 for selecting the recommended software-stack 114 for the target software item. In some examples, the processor 1102 can receive the pipeline configuration data 1108 from the client device 102 or a repository via a network. The pipeline can include a search process 1116 for identifying and analyzing a plurality of software-stack candidates 1118 associated with the target software item.

In block 1206, the processor 1102 constructs the pipeline 124 using the configurable pipeline units based on the pipeline configuration data 1108. One or more of the pipeline units of the configurable pipeline units can be arranged in the pipeline 124 to guide a search process 1116 by adjusting one or more parameters 1120 of the search process 1116. For example one or more of the configurable pipeline units can be positioned prior to the search process 1116 in the pipeline 124 to manipulate the inputs to the search process 1116. This may narrow or alter a search space to be searched during the search process 1116.

The processor 1102 can construct the pipeline 124 using any number and combination of techniques. For example, the processor 1102 can parse the pipeline configuration data 1108 to identify a set of fields corresponding to each configurable pipeline unit described in the pipeline configuration data 1108. The processor 1102 can then analyze each set of fields to determine which configurable pipeline units are to be included in the pipeline 124 and where they are to be included in the pipeline 124. Once the configurable pipeline units and their order are determined, the processor 1102 can configure each pipeline unit to have the settings specified in its corresponding set of fields. In this way, the processor 1102 to construct the pipeline 124 based on the pipeline configuration data 1108.

In block 1208, the processor 1102 executes execute the pipeline 124 to select a particular software-stack candidate from among a plurality of software-stack candidates 1118 as the recommended software-stack 114. Executing the pipeline 124 may involve executing each pipeline unit in sequence such that outputs from one pipeline unit are fed as inputs to the next pipeline unit. One of the pipeline units can implement the search process 1116, which can involve generating and scoring software-stack candidates 1118 for the target software item. Each of the software-stack candidates 1118 can have its own unique configuration of software components. The processor 1102 can generate the software-stack candidates 1118 by executing a search algorithm, such as a heuristic search algorithm or a stochastic search algorithm.

In block 1210, the processor 202 transmits a response 1114 to the client device 102 indicating the recommended software-stack 114 for the target software item. This may enable the recommended software-stack 114 to be included (e.g., installed) in a target computing environment. In some examples, the response 1114 can be an electronic communication transmitted over a network to the client device 102.

In some aspects, pipelines for implementing a software-stack resolution process can be constructed according to one or more of the following examples. As used below, any reference to a series of examples is to be understood as a reference to each of those examples disjunctively (e.g., "Examples 1-4" is to be understood as "Examples 1, 2, 3, or 4").

Example #1: A non-transitory computer-readable medium comprising program code that is executable by a processor for causing the processor to: receive a request from a client device for a recommended software-stack for a target software item; receive pipeline configuration data specifying configurable pipeline units to be included in a pipeline for selecting the recommended software-stack for the target software item; construct the pipeline using the configurable pipeline units based on the pipeline configuration data; execute the pipeline to select a particular software-stack candidate from among a plurality of software-stack candidates as the recommended software-stack; and transmit a response to the client device indicating the recommended software-stack for the target software item.

Example #2: The non-transitory computer-readable medium of Example #1, wherein one or more pipeline units of the configurable pipeline units are arranged in the pipeline to guide a search process of the pipeline by adjusting one or more parameters of the search process.

Example #3: The non-transitory computer-readable medium of Example #2, wherein the search process is configured for identifying and analyzing the plurality of software-stack candidates associated with the target software item, and wherein at least one pipeline unit of the configurable pipeline units is configured to guide the search process by causing one or more software packages to be included in, excluded from, or prioritized in the search process.

Example #4: The non-transitory computer-readable medium of Example #2, wherein at least one pipeline unit of the configurable pipeline units is configured to override a result from the search process with an alternative result, and further comprising program code that is executable by the processor for causing the processor to determine the recommended software-stack based on the alternative result.

Example #5: The non-transitory computer-readable medium of Example #2, wherein the configurable pipeline units include at least two different types of pipeline units that are configured to influence the search process in at least two different ways.

Example #6: The non-transitory computer-readable medium of Example #1, further comprising program code that is executable by the processor for causing the processor to: receive the pipeline configuration data from a repository that includes a plurality of files defining a plurality of different configurations of the configurable pipeline units, the plurality of files being usable to construct a plurality of different pipelines for selecting the recommended software-stack for the target software item.

Example #7: The non-transitory computer-readable medium of Example #1, wherein the pipeline configuration data includes a set of parameters for a pipeline unit of the configurable pipeline units; and wherein the set of parameters includes a type of the pipeline unit, a criterion dictating whether or not the pipeline unit is to be included in the pipeline, another criterion dictating where the pipeline unit is to be included in the pipeline, and a dependency of the pipeline unit on another pipeline unit of the configurable pipeline units.

Example #8: A method comprising: receiving, by a processor, a request from a client device for a recommended software-stack for a target software item; receiving, by the processor, pipeline configuration data specifying configurable pipeline units to be included in a pipeline for selecting the recommended software-stack for the target software item; constructing, by the processor, the pipeline using the configurable pipeline units based on the pipeline configuration data; executing, by the processor, the pipeline to select a particular software-stack candidate from among a plurality of software-stack candidates as the recommended software-stack; and transmitting, by the processor, a response to the client device indicating the recommended software-stack for the target software item.

Example #9: The method of Example #8, wherein the pipeline configuration data describes the configurable pipeline units in a declarative format, and wherein one or more pipeline units of the configurable pipeline units are arranged in the pipeline to guide a search process of the pipeline by influencing one or more aspects of the search process.

Example #10: The method of Example #9, wherein the one or more pipeline units are configured to guide the search process by causing one or more software packages to be included in, excluded from, or prioritized in the search process.

Example #11: The method of Example #9, wherein at least one pipeline unit of the configurable pipeline units is configured to override a result from the search process with an alternative result, and further comprising: determining, by the processor, the recommended software-stack based on the alternative result.

Example #12: The method of Example #9, wherein the configurable pipeline units include different types of pipeline units that are configured to perform different sets of operations for guiding the search process.

Example #13: The method of Example #8, further comprising: receiving, by the processor, the pipeline configuration data from a repository that includes a plurality of files defining a plurality of different configurations of the configurable pipeline units, the plurality of files being usable to construct a plurality of different pipelines for selecting the recommended software-stack for the target software item.

Example #14: The method of Example #8, wherein: the pipeline configuration data includes a set of parameters for a pipeline unit of the configurable pipeline units; and the set of parameters includes a type of the pipeline unit, a criterion dictating whether the pipeline unit is to be included in the pipeline, another criterion dictating where the pipeline unit is to be included in the pipeline, and a dependency of the pipeline unit on another pipeline unit of the configurable pipeline units.

Example #15: A system comprising: a processor; and a memory comprising instructions that are executable by the processor for causing the processor to: receive a request from a client device for a recommended software-stack for a target software item; receive pipeline configuration data specifying configurable pipeline units to be included in a pipeline for selecting the recommended software-stack for the target software item; construct the pipeline using the configurable pipeline units based on the pipeline configuration data; execute the pipeline to select a particular software-stack candidate, from among a plurality of software-stack candidates associated with the target software item, as the recommended software-stack; and transmit a response to the client device indicating the recommended software-stack for the target software item.

Example #16: The system of Example #15, wherein the pipeline configuration data describes the configurable pipeline units in a declarative format, wherein the pipeline includes a search process for identifying and analyzing the plurality of software-stack candidates associated with the target software item, and wherein one or more pipeline units of the configurable pipeline units are arranged in the pipeline to guide the search process by influencing one or more aspects of the search process.

Example #17: The system of Example #16, wherein the one or more pipeline units are configured to guide the search process by causing one or more software packages to be included in, excluded from, or prioritized in the search process.

Example #18: The system of Example #16, wherein at least one pipeline unit of the configurable pipeline units is configured to override a result from the search process with an alternative result, and wherein the memory further includes instructions that are executable by the processor for causing the processor to determine the recommended software-stack based on the alternative result.

Example #19: The system of Example #16, wherein the one or more aspects include an input to the search process.

Example #20: The system of Example #15, wherein the memory further includes instructions that are executable by the processor for causing the processor to: receive the pipeline configuration data from a repository that includes a plurality of files defining a plurality of different configurations of the configurable pipeline units, the plurality of files being usable to construct a plurality of different pipelines for selecting the recommended software-stack for the target software item.

Example #21: A system comprising: a means for receiving a request from a client device for a recommended software-stack for a target software item; a means for receiving pipeline configuration data specifying configurable pipeline units to be included in a pipeline for selecting the recommended software-stack for the target software item; a means for constructing the pipeline using the configurable pipeline units based on the pipeline configuration data; a means for executing the pipeline to select a particular software-stack candidate, from among a plurality of software-stack candidates associated with the target software item, as the recommended software-stack; and a means for transmitting a response to the client device indicating the recommended software-stack for the target software item.

Example #22: The system of Example #21, wherein the pipeline configuration data describes the configurable pipeline units in a declarative format.

Example #23: The system of Example #21, wherein one or more pipeline units of the configurable pipeline units are configured to guide a search process by causing one or more software packages to be included in, excluded from, or prioritized in the search process.

Example #24: The system of Example #21, wherein at least one pipeline unit of the configurable pipeline units is configured to override a result from a search process with an alternative result.

Example #25: The system of Example #21, wherein the configurable pipeline units include different types of pipeline units that are configured to perform different sets of operations for guiding a search process.

Example #26: The system of Example #21, further comprising a means for receiving the pipeline configuration data from a repository that includes a plurality of files defining a plurality of different configurations of the configurable pipeline units, the plurality of files being usable to construct a plurality of different pipelines for selecting the recommended software-stack for the target software item.

Example #27: The system of Example #21, wherein: the pipeline configuration data includes a set of parameters for a pipeline unit of the configurable pipeline units; and the set of parameters includes a type of the pipeline unit, a criterion dictating whether the pipeline unit is to be included in the pipeline, another criterion dictating where the pipeline unit is to be included in the pipeline, and a dependency of the pipeline unit on another pipeline unit of the configurable pipeline units.

Example #28: A non-transitory computer-readable medium comprising pipeline configuration data specifying configurable pipeline units to be included in a pipeline for selecting a recommended software-stack for a target software item from among a plurality of software-stack candidates, the pipeline including a search process for identifying and analyzing the plurality of software-stack candidates associated with the target software item, wherein the configurable pipeline units are configured to guide the search process by influencing one or more aspects of the search process.

Example #29: The non-transitory computer-readable medium of Example #28, wherein the pipeline configuration data describes the configurable pipeline units in a declarative format.

Example #30: The non-transitory computer-readable medium of Example #28, wherein at least one pipeline unit of the configurable pipeline units is configured to guide the search process by causing one or more software packages to be included in, excluded from, or prioritized in the search process.

Example #31: The non-transitory computer-readable medium of Example #28, wherein at least one pipeline unit of the configurable pipeline units is configured to override a result from the search process with an alternative result.

Example #32: The non-transitory computer-readable medium of Example #28, wherein the configurable pipeline units include different types of pipeline units that are configured to influence the search process in different ways.

Example #33: The non-transitory computer-readable medium of Example #28, further comprising a plurality of files defining a plurality of different configurations of the configurable pipeline units, the plurality of files being usable to construct a plurality of different pipelines for selecting the recommended software-stack for the target software item.

Example #34: The non-transitory computer-readable medium of Example #28, wherein: the pipeline configuration data includes a set of parameters for a pipeline unit of the configurable pipeline units; and the set of parameters includes a type of the pipeline unit, a criterion dictating whether the pipeline unit is to be included in the pipeline, another criterion dictating where the pipeline unit is to be included in the pipeline, and a dependency of the pipeline unit on another pipeline unit of the configurable pipeline units.

Example #35: The non-transitory computer-readable medium of Example #28, further comprising program code that is executable by a processor for causing the processor to execute the search process to determine the recommended software-stack for the target software item, wherein the search process involves: executing a Monte-Carlo tree-search algorithm to recursively analyze direct and indirect dependencies of the target software item for generating a search space that includes the plurality of software-stack candidates; selecting the plurality of software-stack candidates from the search space; based on selecting the plurality of software-stack candidates from the search space, analyzing the plurality of software-stack candidates based on a characteristic of a target computing environment associated with the target software item to generate a plurality of scores for the plurality of software-stack candidates; and selecting, based on the plurality of scores, a particular software-stack candidate from among the plurality of software-stack candidates as the recommended software-stack.

Example #36: The non-transitory computer-readable medium of Example #35, wherein the characteristic is a hardware characteristic or a software characteristic of the target computing environment.

Example #37: The non-transitory computer-readable medium of Example #35, wherein the one or more aspects include an input to the search process.

Example #38: A non-transitory computer-readable medium comprising a file that lists configurable pipeline units in a particular sequence in which the configurable pipeline units are to be included in a pipeline for selecting a recommended software-stack for a target software item from among a plurality of software-stack candidates, the file including a respective set of parameters for each pipeline unit of the configurable pipeline units, the file being ingestible by a resolver for automatically constructing and configuring the pipeline based on the respective set of parameters for each pipeline unit.

Example #39: The non-transitory computer-readable medium of Example #38, wherein the resolver is configured to execute the pipeline to implement a search process that is guided by the configurable pipeline units to select a particular software-stack candidate from among the plurality of software-stack candidates as the recommended software-stack Example #40: A client device comprising: a processor; and a memory comprising instructions that are executable by the processor for causing the processor to: transmit a request to a server for a recommended software-stack for a target software item; and receive a response from the server indicating the recommended software-stack for the target software item; wherein the server is configured to: receive pipeline configuration data specifying configurable pipeline units to be included in a pipeline for selecting the recommended software-stack for the target software item; construct the pipeline using the configurable pipeline units based on the pipeline configuration data; and execute the pipeline to select a particular software-stack candidate from among a plurality of software-stack candidates as the recommended software-stack.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A non-transitory computer-readable medium comprising program code that is executable by a processor for causing the processor to:
receive a request from a client device for a recommended software-stack for a target software item;
receive pipeline configuration data specifying configurable pipeline units to be included in a pipeline for selecting the recommended software-stack for the target software item, wherein the pipeline is for searching through a plurality of software-stack candidates to select the recommended software-stack for the target software item, and wherein the pipeline configuration data further specifies a particular order in which the configurable pipeline units are to be arranged in the pipeline;
dynamically construct the pipeline based on an analysis of the pipeline configuration data to have the configurable pipeline units arranged in the particular order specified in the pipeline configuration data, wherein a searching unit in the dynamically constructed pipeline is executable to analyze direct and indirect dependencies of the target software item to develop a search space that includes the plurality of software-stack candidates;
execute the pipeline to select a particular software-stack candidate from among the plurality of software-stack candidates as the recommended software-stack; and
transmit a response to the client device indicating the recommended software-stack for the target software item.

2. The non-transitory computer-readable medium of claim 1, wherein one or more pipeline units of the configurable pipeline units are arranged in the pipeline to guide a search process of the searching unit by adjusting one or more parameters of the search process, the one or more pipeline units being positioned before the searching unit in the pipeline.

3. The non-transitory computer-readable medium of claim 2, wherein the search process is configured for identifying and analyzing the plurality of software-stack candidates associated with the target software item, and wherein at least one pipeline unit of the configurable pipeline units is configured to guide the search process by causing one or more software packages to be included in, excluded from, or prioritized in the search process.

4. The non-transitory computer-readable medium of claim 2, wherein at least one pipeline unit of the configurable pipeline units is configured to override a result from the search process with an alternative result, and further comprising program code that is executable by the processor for causing the processor to determine the recommended software-stack based on the alternative result.

5. The non-transitory computer-readable medium of claim 2, wherein the configurable pipeline units include at least two different types of pipeline units that are configured to influence the search process in at least two different ways.

6. The non-transitory computer-readable medium of claim 1, further comprising program code that is executable by the processor for causing the processor to:
receive the pipeline configuration data from a repository that includes a plurality of files defining a plurality of different parameter configurations of the configurable pipeline units, the plurality of files being usable to dynamically construct a plurality of different pipelines for selecting the recommended software-stack for the target software item.

7. The non-transitory computer-readable medium of claim 1, wherein:
the pipeline configuration data includes a set of parameters for a pipeline unit of the configurable pipeline units; and
the set of parameters includes a type of the pipeline unit, a criterion dictating whether or not the pipeline unit is to be included in the pipeline, another criterion dictating where the pipeline unit is to be included in the pipeline, and a dependency of the pipeline unit on another pipeline unit of the configurable pipeline units.

8. A method comprising:
receiving, by a processor, a request from a client device for a recommended software-stack for a target software item;
receiving, by the processor, pipeline configuration data specifying configurable pipeline units that are to be included in a pipeline, wherein the pipeline is for searching through a plurality of software-stack candidates to select the recommended software-stack for the target software item, and wherein the pipeline configuration data further specifies a particular order in which the configurable pipeline units are to be arranged in the pipeline;
dynamically constructing, by the processor, the pipeline based on an analysis of the pipeline configuration data to have the configurable pipeline units arranged in the particular order specified in the pipeline configuration data, wherein a searching unit in the dynamically constructed pipeline is executable to analyze direct and indirect dependencies of the target software item to develop a search space that includes the plurality of software-stack candidates;
executing, by the processor, the pipeline to select a particular software-stack candidate from among the plurality of software-stack candidates as the recommended software-stack; and
transmitting, by the processor, a response to the client device indicating the recommended software-stack for the target software item.

9. The method of claim 8, wherein the pipeline configuration data describes the configurable pipeline units in a declarative format, and wherein one or more pipeline units of the configurable pipeline units are arranged in the pipeline to guide a search process of the searching unit by influencing one or more aspects of the search process.

10. The method of claim 9, wherein the one or more pipeline units are configured to guide the search process by causing one or more software packages to be included in, excluded from, or prioritized in the search process.

11. The method of claim 9, wherein at least one pipeline unit of the configurable pipeline units is configured to override a result from the search process with an alternative result, and further comprising:
determining, by the processor, the recommended software-stack based on the alternative result.

12. The method of claim 9, wherein the configurable pipeline units include different types of pipeline units that are configured to perform different sets of operations for guiding the search process.

13. The method of claim 8, further comprising:
receiving, by the processor, the pipeline configuration data from a repository that includes a plurality of files defining a plurality of different sequences of the configurable pipeline units, the plurality of files being usable to dynamically construct a plurality of different pipelines for selecting the recommended software-stack for the target software item.

14. The method of claim 8, wherein:
the pipeline configuration data includes a set of parameters for a pipeline unit of the configurable pipeline units; and
the set of parameters includes a type of the pipeline unit, a criterion dictating whether the pipeline unit is to be included in the pipeline, another criterion dictating where the pipeline unit is to be included in the pipeline, and a dependency of the pipeline unit on another pipeline unit of the configurable pipeline units.

15. A system comprising:
a processor; and
a memory comprising instructions that are executable by the processor for causing the processor to:
receive a request from a client device for a recommended software-stack for a target software item;
receive pipeline configuration data specifying configurable pipeline units that are to be included in a pipeline, wherein the pipeline is for searching through a plurality of software-stack candidates to select the recommended software-stack for the target software item, and wherein the pipeline configuration data further specifies a particular order in which the configurable pipeline units are to be arranged in the pipeline;
dynamically construct the pipeline based on an analysis of the pipeline configuration data to have the configurable pipeline units arranged in the particular order specified in the pipeline configuration data, wherein a searching unit in the dynamically constructed pipeline is executable to analyze direct and indirect dependencies of the target software item to develop a search space that includes the plurality of software-stack candidates;
execute the pipeline to select a particular software-stack candidate from among the plurality of software-stack candidates as the recommended software-stack; and
transmit a response to the client device indicating the recommended software-stack for the target software item.

16. The system of claim 15, wherein the pipeline configuration data describes the configurable pipeline units in a declarative format, wherein the searching unit is configured to perform a search process for identifying and analyzing the plurality of software-stack candidates associated with the target software item, and wherein one or more pipeline units of the configurable pipeline units are arranged in the pipeline to guide the search process by influencing one or more aspects of the search process.

17. The system of claim 16, wherein the one or more pipeline units are configured to guide the search process by causing one or more software packages to be included in, excluded from, or prioritized in the search process.

18. The system of claim 16, wherein at least one pipeline unit of the configurable pipeline units is configured to override a result from the search process with an alternative result, and wherein the memory further includes instructions that are executable by the processor for causing the processor to determine the recommended software-stack based on the alternative result.

19. The system of claim 16, wherein the one or more aspects include an input to the search process.

20. The system of claim 15, wherein the memory further includes instructions that are executable by the processor for causing the processor to:
 receive the pipeline configuration data from a repository that includes a plurality of files defining a plurality of different configurations of the configurable pipeline units, the plurality of files being usable to construct a plurality of different pipelines for selecting the recommended software-stack for the target software item.

* * * * *